A. M. BOLLINGER, DEC'D.
A. L. HILL, ADMINISTRATOR.
TOY.
APPLICATION FILED JAN. 27, 1914.
1,107,885.
Patented Aug. 18, 1914.
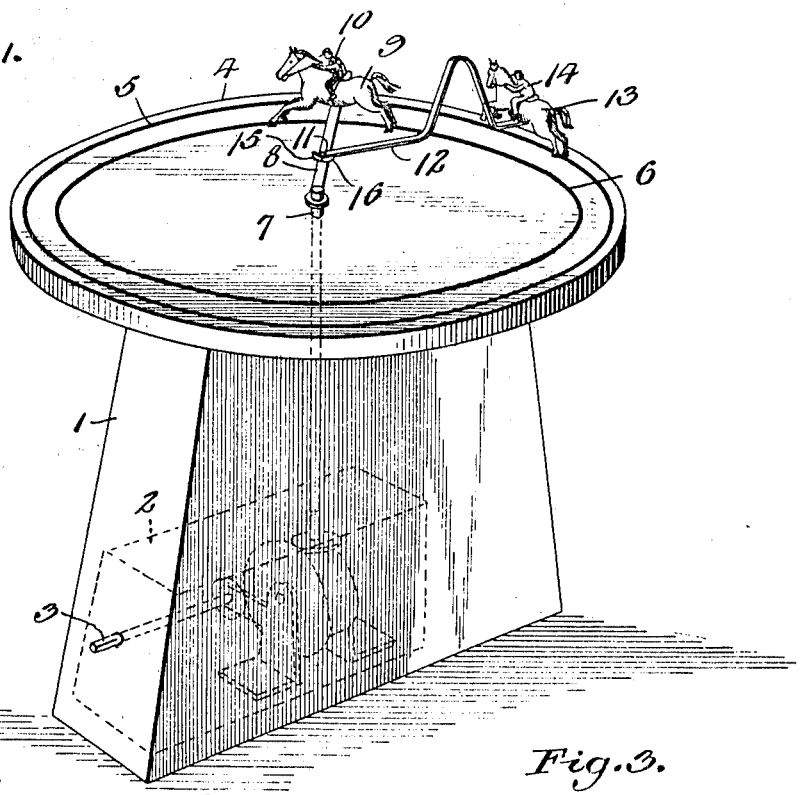
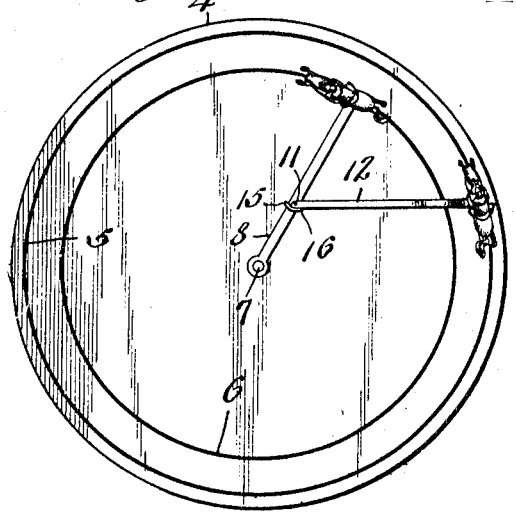
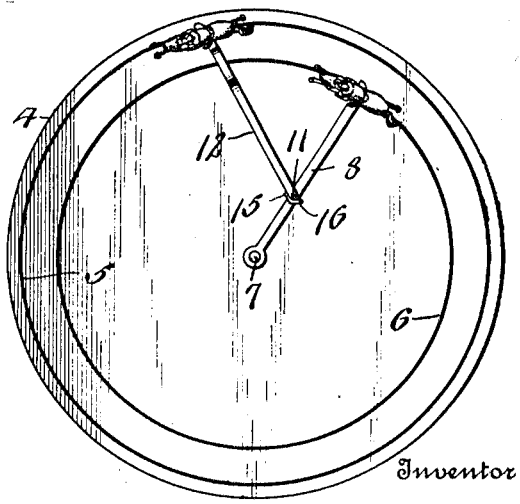
Inventor
A. M. Bollinger,
By Victor J. Evans
Attorney
Witnesses

UNITED STATES PATENT OFFICE.

ALEXANDER M. BOLLINGER, OF LEECHBURG, PENNSYLVANIA; A. LEROY HILL ADMINISTRATOR OF SAID BOLLINGER, DECEASED.

TOY.

1,107,885. Specification of Letters Patent. Patented Aug. 18, 1914.

Application filed January 27, 1914. Serial No. 814,795.

*To all whom it may concern:*

Be it known that I, ALEXANDER M. BOLLINGER, a citizen of the United States, residing at Leechburg, in the county of Armstrong and State of Pennsylvania, have invented new and useful Improvements in Toys, of which the following is a specification.

This invention relates to toys.

An object of the invention is the provision of a toy having a platform representing a race-course and animal figures traveling in different relative paths around the course and arranged so that under the normal active operation of the toy, one of the animal figures will be made to travel behind the other animal figure and to then advance to a position in front of said other animal figure when the active operation of the toy ceases.

With these and other objects in view, the invention consists of certain novel features of construction, combination and arrangement of parts, as will be hereinafter described and claimed.

In the accompanying drawings:—Figure 1 is a perspective view of the toy; Fig. 2 is a top plan view thereof, showing the positions occupied by the animal figures under the active operation of the driving means; Fig. 3 is a view similar to Fig. 2, showing the position of the animal figures when the driving mechanism is rendered inactive.

I contemplate providing a toy representing a race course on which figures simulating horses are adapted to travel in a natural-like manner and in which one of the figures will, at a certain period in the operation of the driving mechanism of the toy be made to advance to a position in front of the other or companion figure. It is therefore possible that such operation may be accomplished by providing a stand or support 1 having a spring driven motor which is conventionally illustrated at 2 and provided with a winding shaft 3 of any suitable well known form whereby power may be supplied to the driven means to be subsequently referred to.

Above the stand 1 is a platform 4 simulating a race track and suitably defined upon the platform are concentric ways or courses 5 and 6.

The driving means of the spring mechanism is in the form of a vertical shaft 7, which extends through the stand 1 and which is operatively geared or otherwise suitably connected with the motor. The mentioned shaft extends through the central portion of the platform 4, and at a point above the platform the shaft has fixedly secured thereto the inner end of a horizontal arm 8. This arm terminates at its free end near the inner course or way 6 which is defined upon the platform and said free end of the arm supports an animal figure 9 representing a horse and seated upon the figure is a figure 10 representing a rider or jockey.

Pivoted at 11 at a point between the ends of the arm 8 is an arm 12. This arm terminates at its outer end at a point above the portion of the platform which defines the course or way 5 and said second arm supports a figure 13 representing a horse and seated upon said figure is a second figure 14 representing a rider or jockey. The arm 12 is movable between stops 15 and 16 forming a part of the arm 8 and normally said arm 12 is engaged against the stop 16 and disposed substantially at a tangent to the axis of the platform. In this manner the animal figure 14 is thus made to appear as traveling at a point to the rear of the animal figure 9 of the arm 8.

It is assumed that the shaft 7 is revolved under the action of the motor 2. Both arms 8 and 12 are thus moving over the platform 4 and the figures 9 and 13 appear as racing one another, the latter being behind the former, and such relative positions of said animal figures are thus maintained under the spring action of the driving motor. When the motor ceases to operate the arm 8 comes to a rest and as a consequence thereof the arm 12 under centrifugal action is instantly moved to a position where the animal figure 13 thereof will advance to a point on the platform in front of the animal figure 9, thus causing them to appear as if the said figure 13 has finished as a winner of the race. The stops 15 and 16 are positioned so as to hold the arms 12 against swinging beyond predetermined or fixed positions, as will be understood.

In practice, it is found that the arrangement specified furnishes a large quantity of amusement and the act to be performed by the animal figures is made extremely realistic. As the shaft 7 comes to a stop, the arm 12 gradually approaches the figure 9 of the arm 8.

I claim:—

1. A toy comprising a revolving arm, a figure supported by said arm, an arm pivoted to the first arm and normally arranged at an angle thereto, the said second arm having a length whereby the free end thereof extends to a point beyond the free end of the first arm, and a figure carried by the second arm.

2. A toy comprising an arm mounted for revolution, a figure carried by said arm, a second arm pivotally connected to the first-named arm and also having a figure, and means to limit the angular movement of the second arm with respect to the first named arm.

3. A toy comprising a plurality of figure carrying arms mounted for revolution around a common center and also connected together for independent angular movement.

In testimony whereof I affix my signature in presence of two witnesses.

ALEXANDER M. BOLLINGER.

Witnesses:
T. LEE VAN GIESEN,
D. W. SALSGIVER.